United States Patent
Cunningham et al.

(10) Patent No.: US 10,157,387 B2
(45) Date of Patent: Dec. 18, 2018

(54) METHOD AND SYSTEM FOR ESTABLISHING A RESERVE PRICE FOR A PUBLISHER'S AD SPACE INVENTORY OFFERED VIA A REAL-TIME BIDDING MARKET

(75) Inventors: Stephan Cunningham, Pasadena, CA (US); Michael Paul Lum, Pasadena, CA (US); John Linden, Pasadena, CA (US)

(73) Assignee: OpenX Technologies, Inc., Pasadena, CA (US)

( * ) Notice: Subject to any disclaimer, the term of this patent is extended or adjusted under 35 U.S.C. 154(b) by 569 days.

(21) Appl. No.: 12/640,430

(22) Filed: Dec. 17, 2009

(65) Prior Publication Data

US 2010/0241511 A1   Sep. 23, 2010

Related U.S. Application Data

(60) Provisional application No. 61/138,430, filed on Dec. 17, 2008.

(51) Int. Cl.
*G06Q 30/02* (2012.01)

(52) U.S. Cl.
CPC ......... *G06Q 30/02* (2013.01); *G06Q 30/0247* (2013.01); *G06Q 30/0275* (2013.01)

(58) Field of Classification Search
CPC ....................................................... G06Q 30/02
USPC ...................................................... 705/14.71
See application file for complete search history.

(56) References Cited

U.S. PATENT DOCUMENTS

| | | | |
|---|---|---|---|
| 2007/0219865 A1* | 9/2007 | Leining | G06Q 30/02 705/14.55 |
| 2008/0103903 A1* | 5/2008 | Flake et al. | 705/14 |
| 2008/0154784 A1* | 6/2008 | Veeraraghavan | 705/80 |
| 2009/0083098 A1* | 3/2009 | Schwarz | 705/7 |
| 2009/0164298 A1* | 6/2009 | Gluhovsky et al. | 705/10 |
| 2010/0094873 A1* | 4/2010 | Boal | G06F 17/30882 707/737 |

\* cited by examiner

*Primary Examiner* — Daniel M Sorkowitz
(74) *Attorney, Agent, or Firm* — Patent Law Works LLP

(57) ABSTRACT

Methods and systems for establishing a reserve price for a publisher's ad space inventory offered via a real-time bidding market are disclosed. In some embodiments, a certain percentage of traffic (e.g., ad requests) received at an ad market server are redirected to one or more external networks, such as ad networks, for processing. The performance of the redirected ad requests is analyzed to determine an expected clearing price for the ad requests. The expected clearing price of a particular ad request corresponding to a particular ad space, if greater than a publisher-established reserve price, is used as a market reserve price when presenting the ad requests in a real-time bidding market.

20 Claims, 6 Drawing Sheets

METHOD AND SYSTEM FOR ESTABLISHING A RESERVE PRICE FOR A PUBLISHER'S AD SPACE INVENTORY OFFERED VIA A REAL-TIME BIDDING MARKET

RELATED APPLICATIONS

This patent application claims the benefit of the filing date of U.S. Provisional Patent Application No. 61/138,430, filed on Dec. 17, 2008, which is hereby incorporated by reference.

TECHNICAL FIELD

The present disclosure generally relates to online advertising. Some example embodiments relate more specifically to computer-implemented methods and systems for establishing a reserve price at which a publisher's inventory is to be offered via a real-time bidding market.

BACKGROUND

Online advertising involves the presentation of display advertisements (e.g., banner ads, images, text, and/or hyperlinks of various shapes and sizes) embedded into web pages that are rendered and displayed to Internet users. For example, when an Internet user enters a Uniform Resource Locator (URL) into the address bar of a browser application and directs the browser application to request the web page corresponding with the URL, the web page that is rendered and displayed to the user may include one or more display advertisements. Although the goal of displaying advertisements may vary from one ad campaign to the next, many ad campaigns are planned with the objective of driving traffic to a website of the advertiser. For example, the owners of a small online business having a web-based retail store for selling tennis equipment (e.g., tennis racquets, balls, clothes and shoes) may desire to embed display advertisements in the web pages of a web-based tennis magazine or blog, with the hope that the readers of the tennis magazine or blog will view and select the ads for the online tennis store, and ultimately conclude a transaction with the web-based tennis store. Similarly, the content publisher (e.g., the operator of the web-based tennis magazine or blog) may desire to generate revenue by offering to advertisers ad space on web pages for the display of advertisements.

There are a variety of existing methods and mechanisms by which content publishers can make their ad spaces available to advertisers for purchasing, and by which advertisers can find and purchase the ad spaces of content publishers. One way is through direct negotiation. For instance, an advertiser may directly approach a content publisher with a request to purchase ad space in that content publisher's web pages. Another way that a content publisher may offer ad space for sale is through an ad network or ad exchange. Ad networks and ad exchanges are companies that connect content publishers with advertisers who desire to have ads embedded in the content of other content publishers. Ad networks and ad exchanges operate in a variety of different ways. For instance, some are highly automated such that both the content publisher and advertiser can conclude transactions via web-based interfaces, without additional personal interaction. Some ad networks are transparent, providing the advertiser with significant details about the content of the web pages in which the advertiser's ads are to be embedded. Other ad networks are referred to as "blind" networks because the advertisers relinquish control over the selection process that determines the content (e.g., web pages) in which their advertisements will be displayed.

One problem that content publishers face with existing methods and mechanisms that are used to offer ad spaces to advertisers is the limited audience of potential advertisers that can be reached through any particular ad network or ad exchange. For example, some advertisers may work with only one ad network. Therefore, unless a content publisher is working with that particular ad network, the content publisher will not have access to those advertisers. Consequently, in addition to directly negotiating with one or more advertisers, a content publisher may be required to utilize multiple ad networks and/or ad exchanges to find the advertisers that are willing to purchase the content publisher's inventory of ad spaces. This will require that the content publisher establish several user accounts, and become familiar with the various interfaces, policies and procedures of the several ad networks and/or ad exchanges that the content publisher utilizes. Furthermore, the content publisher will be required to retrieve and analyze performance reports—likely in varying formats—for each ad network and/or ad exchange with which the content publisher is using.

Another problem that content publishers frequently encounter is finding the optimum price at which to offer ad spaces to advertisers. For instance, when a content publisher is using a single ad network, the advertisers participating in that ad network may not accurately represent the overall market (specifically, the demand in the broader market) for the offered ad space. Therefore, if a content publisher sets the price for an ad space too low, the content publisher will not realize the fair market value of the ad space. Even in scenarios where the ad network or ad exchange uses an auction system, if the publisher's reserve price is set too low, the limited number of advertisers in any given ad network or ad exchange are not likely to bid the price up to the fair market value, and thus the content publisher is not likely to realize the fair market value of the ad spaces. Consequently, content publishers are left with the burden of tinkering with the price at which their ad spaces are being offered on multiple ad networks and/or ad exchanges, in an effort to find the optimal price. This of course is not an easy task, as the optimal price is likely to change over time, as demand changes and economic conditions change.

DESCRIPTION OF THE DRAWINGS

Some embodiments are illustrated by way of example and not limitation in the figures of the accompanying drawings, in which.

DETAILED DESCRIPTION

Figure 1:
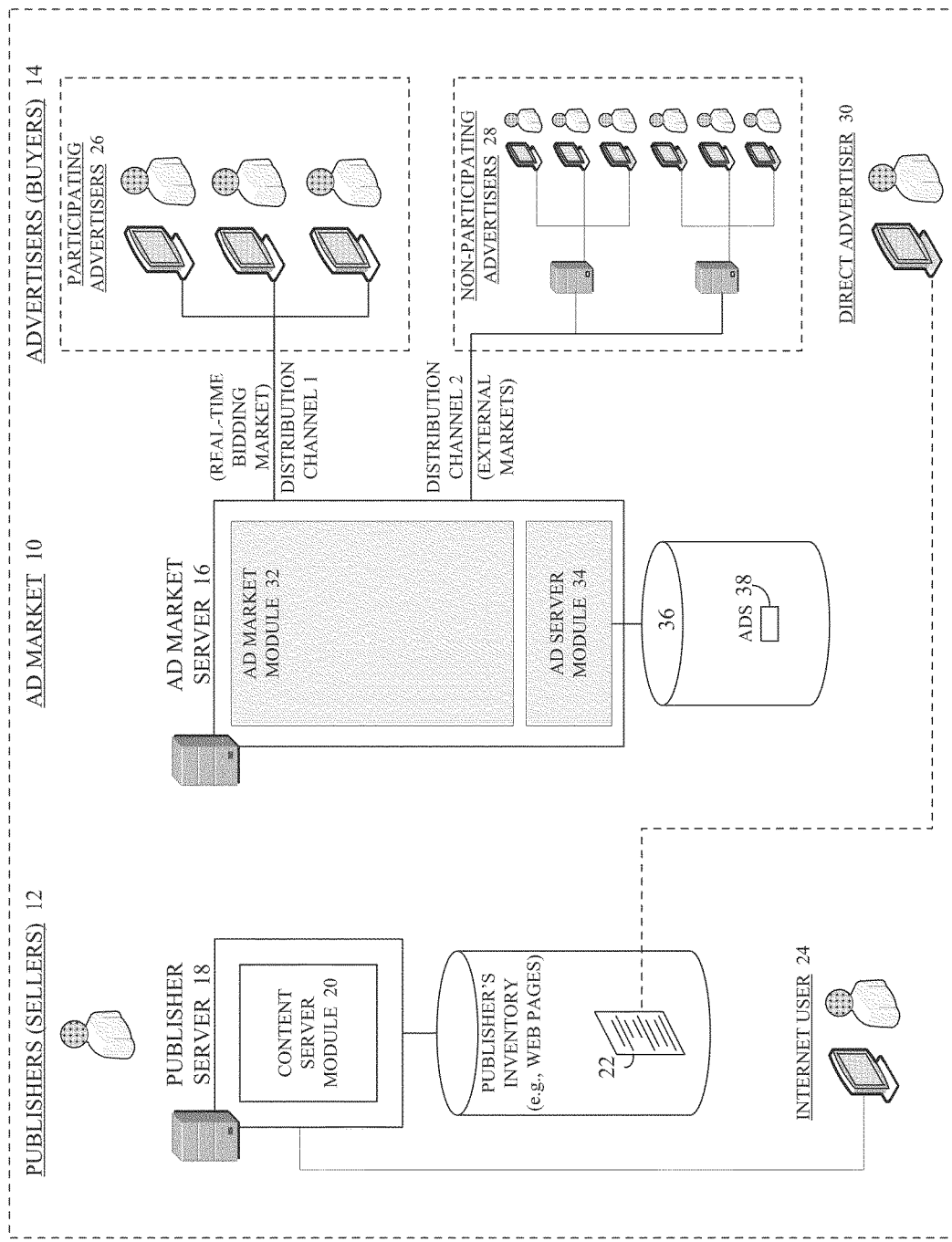
FIG. 1 illustrates an overview of the various computer systems and participants that comprise a computer-implemented market for online ads according to an embodiment of the invention.

Methods and systems for establishing a reserve price for a publisher's inventory of advertisement space offered via a real-time bidding market are described. In the following description, for purposes of explanation, numerous specific details are set forth in order to provide a thorough understanding of example embodiments of the present invention. It will be evident, however, to one skilled in the art that the present invention may be practiced without these specific details.

As used herein, an advertisement space (or simply, ad space) is a space in a web page that has been reserved for the presentation of a display advertisement (or, ad). Consistent with an embodiment of the invention, a market for online advertisements is facilitated by an ad market server. The market facilitated by the server operates as a real-time bidding market for online ad space, and brings together content publishers with an available inventory of ad space and advertisers who desire to have display ads presented in the ad spaces of other content publishers. In this context, publishers participate in the market as sellers of ad space, and advertisers participate as buyers of ad space. Content publishers make their ad spaces available to advertisers participating in the real-time bidding market by providing various information about the content that is being served by a content publisher, as well as information describing the various attributes—for example, size, shape, position on the web page, supported technical capabilities, and so forth—of the ad spaces being offered. Advertisers participating in the real-time bidding market view the information provided by the content publishers, and compete amongst one another for the opportunity to present ads in the described ad spaces by placing bids for the ad spaces.

When a publisher's ad space is first presented to the market, the ad space has associated with it a reserve price established by the content publisher who is offering the ad space. This publisher-established reserve price represents the minimum price at which the publisher is willing to sell the ad space. The ad market server facilitates the testing of the publisher-established reserve price in one or more alternative markets, such as other ad networks or ad exchanges, which are referred to herein as external markets. For instance, an ad space being offered by a content publisher is offered to advertisers participating in one or more external markets to determine the price that the advertisers participating in the external markets are willing to pay for the publisher's ad space. If the advertisers in the external markets show a willingness to pay more than the publisher-established reserve price for the ad space over a given time period (e.g., a price reporting period), the reserve price is increased when the ad space is offered to the participants of the real-time bidding market in a subsequent time period. In this case, the time period over which the performance of an ad space in an external market is analyzed is referred to as a price reporting period. A price reporting period is simply a set duration of time over which ad spaces are made available to one or more external markets. In some embodiments, a price reporting period may coincide with the period of time between which an external market (e.g., ad network or ad exchange) makes a performance report available for a particular ad space. Alternatively, when an external market provides ad performance reports in real-time, the duration of time over which ad performance at any given external market is analyzed may be set by the operator of the real-time bidding market. For instance, if an external market provides a real-time report, and the real-time bidding market analyzes the report on a daily basis, the price reporting period would be one day. Accordingly, at the end of each price reporting period for a particular external market, the performance of a particular ad space is analyzed to determine how well the ad space performed during the price reporting period at the external market to which the ad space was made available. This information is then used in a subsequent price reporting period to both establish a market reserve price for the ad space, and in making decisions as to whether the ad space should continue to be made available to the particular external market.

By making a publisher's ad space available to one or more alternative or external markets, advertisers who for one reason or another are unable or unwilling to participate via the interface of the real-time bidding market are provided an opportunity to purchase, via an external market interface, a participating publisher's ad space. This is beneficial to both the enterprise operating the real-time bidding market and participating content publishers because it increases the total number of advertisers who will have access to, and may potentially be willing to purchase, ad space. In addition, content publishers participating in the real-time bidding market benefit from having their publisher-established reserve price for their ad spaces adjusted upward to reflect the expected clearing price of the ad space, based on actual sales data from recently concluded transactions via the alternative or external markets. Other aspects and advantages of various embodiments of the invention will be apparent to those skilled in the art from the description of the figures that follow.

FIG. 1 illustrates an overview of the various computer systems and participants that comprise a computer-implemented market for online ads according to an embodiment of the invention. As illustrated in FIG. 1, the ad market 10 is primarily comprised of content publishers 12, who participate in the market as sellers of ad space, and advertisers 14, who participate in the market as buyers of ad space. In this computer-based marketplace, the ad market server 16 functions as the "meeting place," where publishers can offer ad spaces for sale, and advertisers can bid on ad spaces available from participating publishers. Accordingly, the ad market server 16 facilitates an ad market service.

A content publisher 12 may be an individual, a group of people, a company, or any other enterprise that owns or controls content that is made accessible for viewing via a publisher server 18. A content publisher 12 utilizes a content server module 20 residing and executing on the publisher server 18 to serve content (e.g., web pages 22) to a client computer 24 of an Internet user. For instance, in some embodiments, the content server module 20 is a web server or application server that serves Internet documents or web pages 22 encoded in a mark-up language (e.g., HTML) that can be rendered by a web browser application executing at a client computer 24, for display to an Internet user. Accordingly, the web pages served by the content server module 20 can be thought of as the publisher's inventory. Each time a web page is served, an opportunity exists to display one or more ads embedded within the web page. Skilled artisans generally refer to this opportunity—that is, the presentation of a web page with a display ad—as a page impression, or simply an impression. Accordingly, the terms "ad space" and "impression" are often used synonymously with the term "inventory" to indicate what it is that is being offered for sale by the publisher.

In the context of the present disclosure, an advertiser is any individual, group of people, company, or any other enterprise, that desires to have ads embedded in the content of other publishers. As illustrated in FIG. 1, for purposes of the present disclosure, advertisers are grouped into three categories—participating advertisers 26, non-participating advertisers 28, and direct advertisers 30. The first group of advertisers are referred to herein as participating advertisers 26 to indicate that the advertisers participate in the real-time bidding market that is facilitated by the ad market module 32 of the ad market server 16. For instance, participating advertisers 26 participate in the real-time bidding market by bidding for the ad spaces of the participating content publishers who make their ad spaces available through the real-time bidding market. Non-participating advertisers 28 are advertisers who do not participate in the real-time bidding market, but may bid for, and/or purchase a publisher's ad space in an alternative or external market, such as an ad network or ad exchange. Finally, a direct advertiser is an advertiser that negotiates directly with a content publisher, bypassing the ad market server 16 altogether. Of course, an advertiser may be in more than one group at any given time. For instance, an advertiser may negotiate directly with a first content publisher, while also participating in the real-time bidding market to purchase ad spaces of one or more other content publishers. Furthermore, a participating content publisher may also participate in the real-time bidding market as an advertiser.

As illustrated in FIG. 1, the ad market server 16 includes an ad server module 34 that is connected to an ad repository 36 storing various ads 38. When processing an ad request, after the ad market server 16 has determined which ad is to be served to an Internet user, the ad server module 34 is directed to serve the particular ad to the Internet user (specifically, the user's client computer 24). Although in FIG. 1 the ad server module 34 is shown to reside on the ad market server 16, in some embodiments the ad server module 34 may reside and execute on an ad server (e.g., server computer) that is separate and distinct from the ad market server 16. For instance, in some embodiments, the ad server module 34 may be accessible to the content publisher 12 as an ad serving service that is hosted by an operator of the ad market 10 or another entity. Alternatively, the ad server module 34 may reside and execute on a server computer owned, operated and/or controlled by the content publisher 12, for example, such as the publisher server 18. When the ad server module 34 is operated by the content publisher 12, in some embodiments the ad market module 32 may include a client plug-in component that resides on the same server as the ad server module 34 and operates in conjunction with the ad server module 34 to make the ad market module 32 of the ad market server 16 accessible. For instance, using an ad market module plug-in, the ad market service becomes an integral component of the ad server service, such that a content publisher can easily designate a certain portion of ad space inventory to be offered via the real-time bidding market through a user interface shared in common with the ad server service. In some embodiments, the ad server module 34 may operate in conjunction with a web server or application server, such that the administration and configuration of the ad server module 34 is accessible via a user interface rendered by a web browser application. Alternatively, in some embodiments, the ad server module 34 may be a desktop application. In any case, content publishers 12 may utilize a user interface of the ad server module 34 to designate a particular ad campaign as an ad campaign that is to participate in the real-time bidding market. Accordingly, as web pages associated with the ad campaign are served, the ad that is embedded within the web page will be determined by the real-time bidding market that is facilitated by the ad market module 32.

As described in greater detail below, the ad market server 16 illustrated in FIG. 1 has two distribution channels through which a publisher's ad space inventory might be made available to advertisers. The first distribution channel is the primary market mechanism, which is referred to herein as the real-time bidding market. The second distribution channel is one or more alternative or external markets, such as ad networks or ad exchanges, which are operated by third parties. Although the second distribution channel is illustrated as a single distribution channel to multiple external markets, it might also be thought of as multiple distribution channels—one for each external market. When processing an ad request, the ad market module 32 determines whether the ad request is to be presented (via the first distribution channel) exclusively to the participating advertisers of the real-time bidding market, or alternatively, to an external market (via the second distribution channel). Accordingly, when a content publisher elects to participate in the real-time bidding market, if an ad campaign established by the content publisher meets certain minimum requirements, the content publisher's ad spaces are made available not only to advertisers participating in the real-time bidding market, but also to advertisers participating in one or more external markets. This occurs without any extra work or effort on the part of the content publisher. For instance, in some embodiments, the content publisher simply has to request that its ad spaces be offered in the real-time bidding market, and if certain minimum requirements are met, a portion of the content publishers ad spaces will be made available to one or more external markets.

In general, there are two stages or phases involved when a content publisher participates in the real-time bidding market. The first stage is a setup process that involves, among other things, establishing an ad campaign and indicating that the ad campaign is to participate in the real-time bidding market. The second stage or phase is referred to herein simply as the active period of the ad campaign. During the active period of the ad campaign, ad requests associated with ad spaces of an established and active ad campaign are directed to the ad market server, where they are processed to identify ads to be served.

Consistent with some embodiments, to establish an ad campaign, a content publisher interacts with a graphical user interface presented by an ad server module 34, which enables content publishers to provide various information describing attributes of the ad spaces being offered, including the specific display ads that are to be served. For instance, if a content publisher has agreed to display a certain number of display ads for a certain advertiser, the content publisher will select the various display ads of the advertiser and associate the display ads with an ad campaign, and particular ad spaces. Additionally, the content publisher may specify the start and end times for the ad campaign. The ad campaign is then linked with one or more web sites or individual web pages on which the display ads are to appear. Finally, after a content publisher has provided the requested information to establish an ad campaign, and linked the ad campaign to one or more web pages, the ad market module 32 generates a snippet of code for each uniquely defined ad space involved in the ad campaign. This snippet of code, which is referred to herein as an invocation tag (but may be known to skilled artisans by other names, such as an ad tag, or ad request tag) is inserted into the source code of an Internet document (e.g., web page) in order to invoke or call the ad server module 34, or the ad market module 32 if the ad campaign has been configured to participate in the real-time bidding market, as described below. For instance, when a web browser application executing at an Internet user's client computer 24 is processing an invocation tag, a message—referred to herein as an ad request—is generated and communicated from the client computer to the ad server module 34, or the ad market module 34 if the invocation tag is associated with an ad space that is part of an ad campaign configured to utilize the real-time bidding market. By invoking the ad server module 34 or ad market module 32, an appropriate ad is identified and served to the requesting Internet user's client computer 24.

After an ad campaign is established, a content publisher can designate the ad campaign as an ad campaign that is to participate in the real-time bidding market. Additionally, if an ad campaign is designated to use the real-time bidding market, the content publisher may be prompted to provide further information describing a content category (e.g., sports, news, politics, and technology) for the web pages being published and served by the content publisher. This allows advertisers to select one or more content categories for the web pages in which they would like their ads to be embedded. A content publisher may specify information identifying certain ad-related content that should not be embedded in the content publisher's web pages. For instance, a content publisher may not allow ads from the content publisher's competitors to be embedded in the content publisher's published content (e.g., web pages). For each ad space of an ad campaign that is to be presented in the real-time bidding market, the publisher establishes a reserve price. The publisher-established reserve price represents the minimum price that a content publisher is willing to accept in exchange for allowing an advertiser's ad to be embedded in a predefined ad space. In addition, for each ad space, the content publisher identifies a default or fallback ad this is to be displayed in the ad space when there are no bids in the real-time bidding market, or at an external market, which meet or exceed the publisher-established reserve price or (in some cases) the market reserve price. When an ad campaign is configured to utilize the real-time bidding market, the invocation tags embedded in the content publisher's web pages and associated with the individual ad spaces will, when processed by an Internet user's client computer 24, invoke the ad market module 32 to request an appropriate display ad.

Advertisers are able to view the information provided by the content publishers relating to those ad campaigns configured to participate in the real-time bidding market, and then bid for the right to have ads embedded in the content publisher's ad spaces. In some embodiments, the ad market module 32 allows advertisers to enhance or enrich the information provided by content publishers, for example, by integrating the publisher-provided information with third party information providing even more granular information on which to make bidding decisions. For instance, third party data may indicate among other things, socio-economic or geographic information about the typical content consumer of certain content publisher's content. Accordingly, using third party provided information about a particular content publisher, an advertiser may determine that the content consumers (e.g., Internet user's that consume or view the content of the content publisher) for a particular content publisher match the audience being targeted by the advertiser.

After a content publisher has established an ad campaign by providing the requested information and configured the ad campaign to utilize the real-time bidding market, the ad campaign is analyzed to determine whether it qualifies for participation in a price optimization procedure, which is referred to herein as the market maker process. For example, in some embodiments, certain minimum requirements must be met before a particular ad campaign is allowed to participate in the market maker process. As described below in connection with the description of FIG. 2, in some embodiments the analysis is at least semi-automated and is performed by an operator or administrator of the ad market service. In some embodiments the analysis may be fully-automated. Furthermore, although some embodiments require that an ad campaign meet certain minimum requirements in order to qualify for the market maker process, in other embodiments, all ad campaigns participating in the real-time bidding market will automatically qualify for the market maker process.

Figure 2:
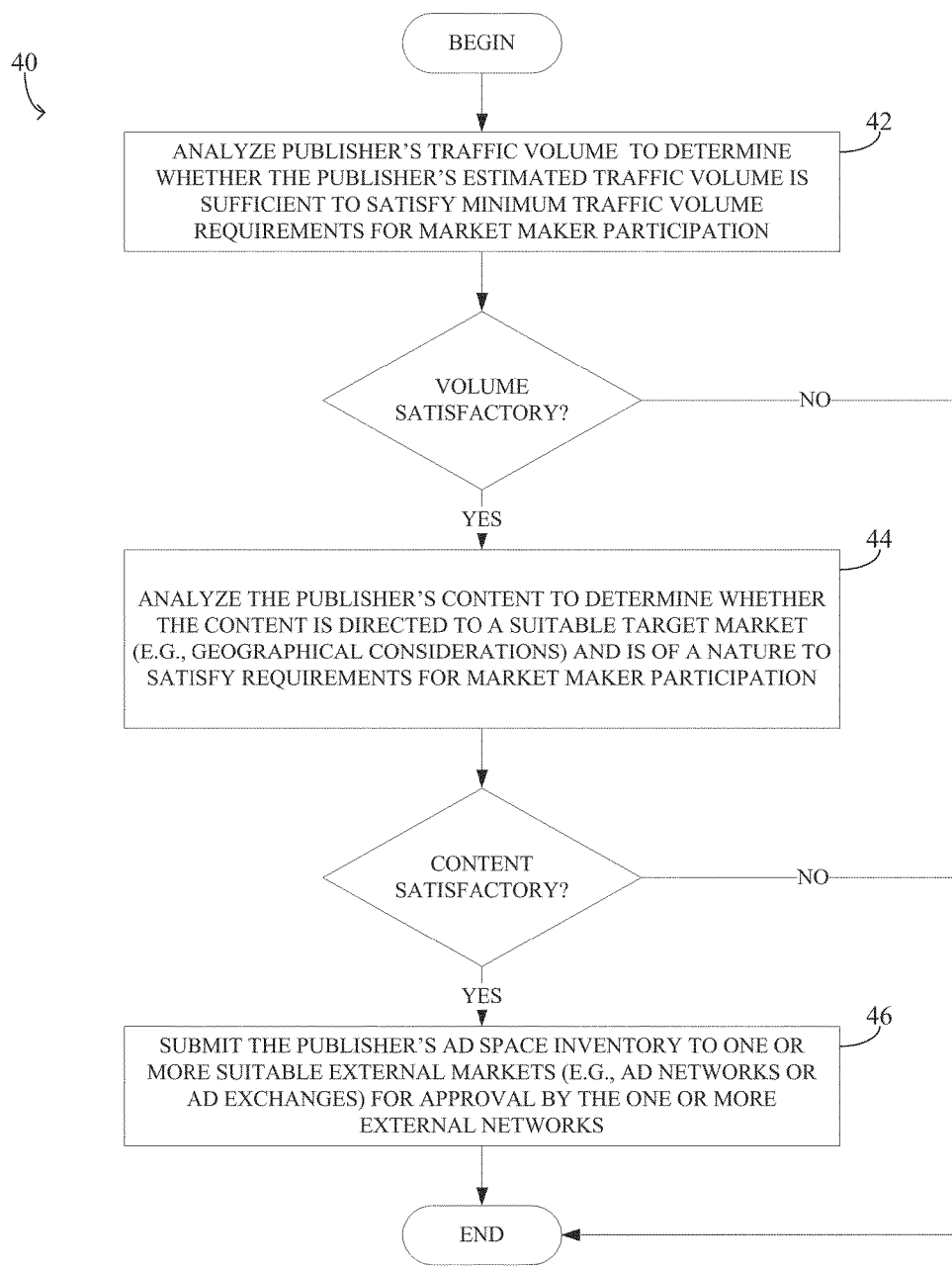
FIG. 2 illustrates the method operations involved in a method for setting up and configuring a publisher's ad space inventory, as defined in a particular ad campaign, for use with a price optimization module (e.g., market maker mechanism or process) according to an embodiment of the invention.

FIG. 2 illustrates the method operations involved in a method for setting up and configuring a publisher's ad space inventory, as defined in a particular ad campaign, for use with a price optimization module (e.g., market maker mechanism or process) according to an embodiment of the invention. It will be readily appreciated that the order in which the method operations are performed could be modified without departing from the scope and spirit of the invention. The method 40 begins at method operation 42 when the content publisher's traffic volume is analyzed to determine whether the estimated traffic volume for the content publisher meets some predefined traffic volume threshold. For instance, the predefined traffic volume threshold specifies a minimum traffic volume that is required for a content publisher's ad campaign to be qualified for the market maker process. For instance, in some embodiments, a content publisher will only qualify for market maker participation if the web pages in which the ad spaces are being offered meet the specified minimum traffic volume requirement. This determination may be made by analyzing relevant traffic information made available from third parties. Accordingly, in some embodiments, the analysis is automated by generating a request that is directed to a traffic volume data provider, and in turn, receiving the relevant information about the content publisher's traffic volume statistics. In some embodiments, the traffic volume analysis may be performed manually, for example, by an administrator or operator of the ad market service. If it is determined that the content publisher does not meet the minimum traffic volume requirement, the content publisher does not qualify for the market maker process, and the content publisher's ad spaces will only be offered to the participants in the real-time bidding market at the publisher-established reserve price.

If, however, the content publisher does meet the minimum traffic volume requirement, at method operation 44 the published content (web pages) of the content publisher is analyzed to determine if the content is suitable for a proposed target market, and to determine if the content is generally of a nature that is suitable for market maker participation. For instance, in some embodiments, information identifying the geographical location of the content consumers is analyzed to assess whether the content consumers reside in a geographical location that is likely to be of interest to advertisers. If, for example, a certain percentage of content consumers of a content publisher's content are located in a particularly undesirable geographical location, it may be determined that the content publisher does not qualify for participation in the market maker process. Similarly, if the content publisher's content is of a nature that makes it unsuitable for participation in the market maker process, the content publisher may be excluded from participating in the market maker program. For example, the content publisher's content may be unsuitable if it is adult content, or if it is otherwise determined that the content is likely to be deemed offensive for one reason or another. In some embodiments, method operation 44 is automated, for example, by providing a bot (e.g., a web bot) or other executable software process that is able to search for certain text or key words on the web pages of the content publisher. Alternatively, in some embodiments, the analysis involved in method operation 44 is manually performed by an administrator or operator of the ad market service. In some embodiments, when a content publisher's content is deemed suitable for the market maker process, the content analysis is repeated on a periodic basis to ensure that the content does not change, and become unsuitable for the market maker process. If the content publisher's content is deemed unsatisfactory, the content publisher does not qualify for the market maker process, and the content publisher's ad spaces will only be offered to the participants in the real-time bidding market at the publisher-established reserve price. Alternatively, if the content publisher's content is deemed highly offensive or generally unsuitable for use with the real-time bidding market, the content publisher may be prohibited from using the real-time bidding market.

At method operation 46, if the content publisher's content has met with approval (e.g., in method operations 42 and 44), the publisher's ad space inventory is submitted to one or more suitable external markets for approval by those external markets. For instance, just as certain information is required for the content publisher to create an ad campaign for use with the real-time bidding market, some or all of that information may be submitted to one or more external markets to allow the publisher to participate in those external markets. In some embodiments, the process of submitting a content publisher's ad space inventory to an external market for approval is automated, or semi-automated. For instance, in some embodiments, an administrator or operator of the ad market service may interact with a graphical user interface facilitated by the ad market server 12 to make certain configuration setting selections (e.g., selecting the particular ad networks or ad exchanges to which to submit the ad space inventory). In some embodiments, after selecting or providing the relevant configuration settings, the administrator or operator of the ad market service submits any information required by an external market, for example, by simply selecting a graphical user interface element (e.g., a button) on a user interface facilitated by the ad market module 32. Once the content publisher's ad space inventory has been approved by the external market(s), the market maker functionality begins, and ad requests received at the ad market module 32 can be redirected to the one or more external markets, in accordance with one or more of the methodologies described below.

Figure 3:
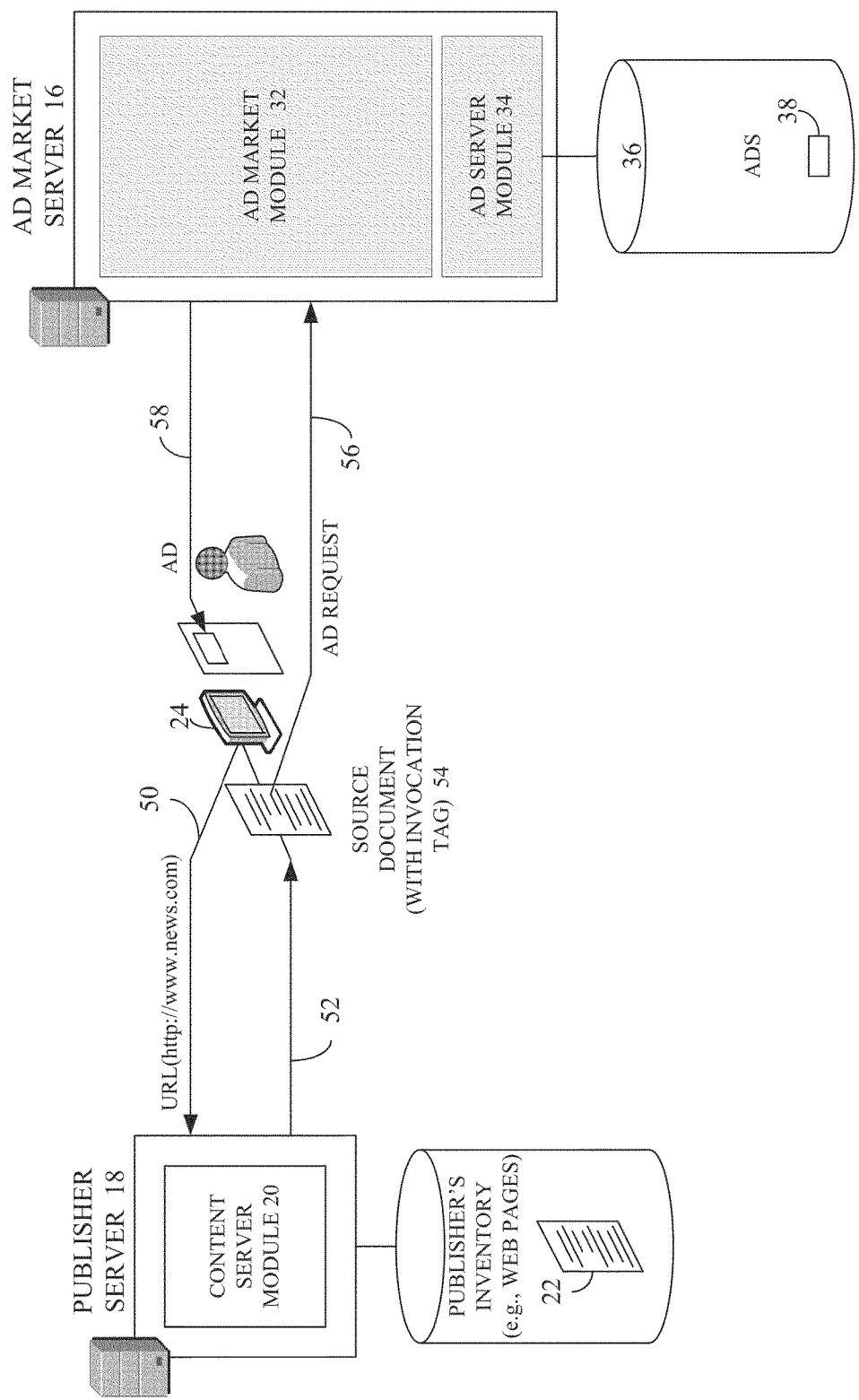
FIG. 3 illustrates an example of the general flow of data between an Internet user's client computer, a content server and an ad market server when a web page with an embedded ad spaces is requested during the active period of an ad campaign, according to an embodiment of the invention.

After a content publisher has established an ad campaign, designated the ad campaign for use with the real-time bidding market, and had the ad campaign approved for the market maker process, the second stage involving the active period of the ad campaign begins. FIG. 3 illustrates an example of the general flow of data between an Internet user's client computer 24, a content server 20 and an ad market server 16 when a web page with an embedded ad spaces is requested during the active period of an ad campaign, according to an embodiment of the invention. In the example illustrated in FIG. 3, the publisher server 18 is presumed to be operated by a content publisher that is participating in the real-time bidding market. For instance, the content publisher whose content is being published to and served by the publisher server 18 has already completed the process to establish an ad campaign, and has indicated that the ad campaign is to participate in the real-time bidding market. Accordingly, the content publisher has already provided information to the ad market server 16 about the content of the web pages 22 being served, the nature of the ad spaces that are being offered in the real-time bidding market, a publisher-established reserve price for each ad space being offered, and a default or fallback ad for each ad space being offered. Additionally, the content publisher has inserted into its web pages an invocation tag for each ad space being offered in the real-time bidding market.

When an Internet user directs a web browser application executing on the client computer 22 to request an Internet document (e.g., a web page) by specifying a uniform resource locator (URL) corresponding with the Internet document hosted at the content publisher's content server 20, a web page (e.g., source document) is served by the content server 20 to the requesting web browser application on the Internet user's client computer 24. For example, in FIG. 3 the request is represented by the arrow with reference number 50 extending from the client computer 24 to the publisher server 18, while the serving of the source document is indicated by the arrow with reference number 52, extending from the publisher server 18 to the client computer 24. In this example, the web page being requested has the uniform resource locator, "http://www.news.com." The content server 20 processes the request for the Internet document, and responds by communicating the source document to the requesting web browser application. The served source document 54 is then processed by the Internet user's web browser application.

The web browser application processes the source document, and in particular, a code snippet (e.g., invocation tag) that is associated with and identifies an ad space that is being offered in the real-time bidding market facilitated by the ad market server 16. When the invocation tag is processed by the web browser at the client computer 24, an ad request directed to the ad market server 16 is generated and forwarded to the ad market server 16, where it is processed by the ad market module 32. This is indicated in the example presented in FIG. 3 by the arrow with reference number 56, extending from the client computer 24 to the ad market server 16.

When the ad market module 32 of the ad market server 16 receives the ad request, the ad market module 32 analyzes the ad request to identify the particular ad campaign and ad space that is associated with the ad request. For example, in some embodiments, the ad request will include an ad request identifier that identifies a particular ad space that is associated with information that has been provided by the content publisher that describes the content of the web page, the nature of the ad space being offered, as well as whether the ad space has been approved for the market maker process. In general, the ad market module 32 of the ad market server 16 processes the ad request to determine which ad is to be served by the ad server module 34, such that the selected ad can be embedded and displayed in the web page rendered by the web browser application of the client computer 24. In this case, determining which ad to serve involves identifying an advertiser in the real-time bidding market that has an active bid that exceeds all other active bids and is equal to, or greater than, the reserve price associated with the ad request. As described in greater detail below, the reserve price may be a publisher-established reserve price, or a market reserve price that is greater than the publisher-established reserve price and established based on an analysis of how previously processed ad requests performed in one or more external markets. In any case, once a winning bidder has been identified, an ad is selected and served to the web browser application of the Internet user, as indicated by the line with reference number 58. Alternatively, the ad market module 32 may determine, as described in greater detail below, that the ad request is to be re-directed to an external market, in which case a selected external market processes the ad request and determines the display ad that is served to the Internet user's client computer. In general, an ad request is directed to an external market when the ad space associated with the ad request has qualified for the market maker process, and the expected clearing price for the ad request at one or more of the external markets exceeds both the reserve price of the ad request and the highest active bid for the ad request in the real-time bidding market. The methodologies used in processing the ad request to identify an ad to serve are described in greater detail below, in connection with FIG. 4.

Figure 4:
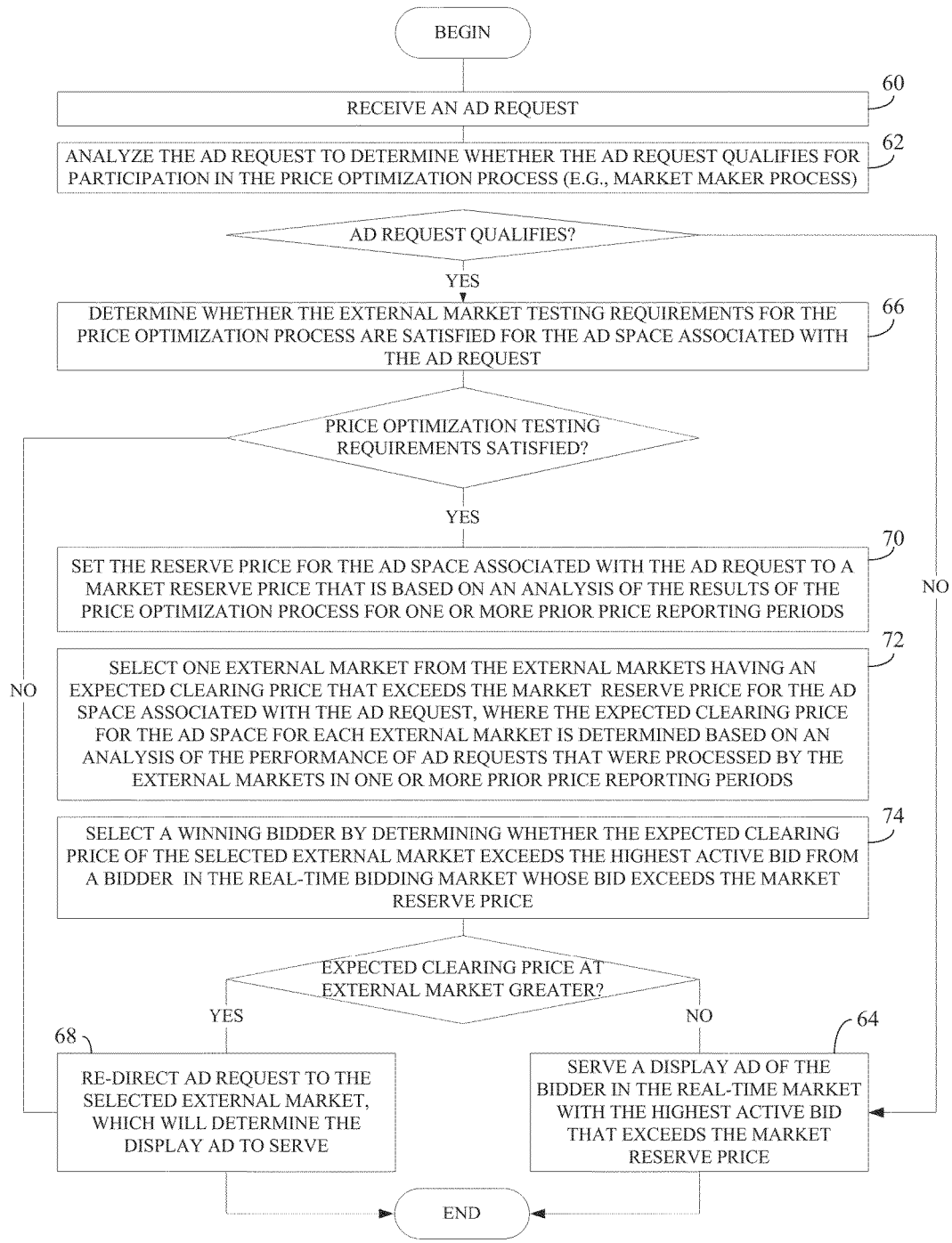
FIG. 4 illustrates the method operations of a method for optimizing a reserve price for a publisher's ad space inventory offered in a real-time bidding market, according to an embodiment of the invention.

FIG. 4 illustrates the method operations of a method for optimizing a reserve price for a publisher's ad space inventory offered in a real-time bidding market, according to an embodiment of the invention. The method begins at method operation 60 when an ad request is received at an ad market server. For example, the ad request is received as a result of a browser application of an Internet user's client computer processing an invocation tag associated with an ad space. Next, at method operation 62, the ad request is analyzed to determine whether the ad request qualifies for participation in a price optimization process, referred to herein as a market maker process. For instance, the ad request may include an ad request identifier that associates the ad request with an ad space and/or ad campaign. The ad market server may perform a look-up operation using the ad request identifier to determine additional information about the ad space associated with the ad request, including whether the particular ad space is eligible for participation in the market maker procedure.

If the ad request is associated with an ad space that is determined to be ineligible for the market maker procedure, then the ad request will only be presented via the first distribution channel to the participants in the real-time bidding market at the publisher-established reserve price. If an ad request is ineligible for the market maker process, at method operation 64 the ad market server identifies the advertiser participating in the real-time bidding market with the highest active bid that exceeds the publisher-established reserve price. A display ad for the highest bidder is then served in response to the ad request. If there is no participating advertiser who has bid an amount greater than the publisher-established reserve price, a display ad designated by the content publisher as the default or fallback ad is selected, served, and presented to the Internet user.

If the ad market server determines, at method operation 62, that the ad request is associated with an ad space that is eligible for the market maker process, the ad market server next determines at method operation 68 whether testing requirements for the market maker process have been satisfied for the particular ad space associated with the ad request. Specifically, for each ad space that is eligible for participation in the market maker process, a certain number of ad requests are directed to each external market that has approved the ad space. This ensures that a sufficient quantity of ad requests are processed at each external market in order to accurately predict an expected clearing price for the ad request for each external market. For instance, each external market that is configured to receive ad requests associated with a particular ad space will receive a certain volume of ad requests to ensure that the actual average clearing price for an ad space in one or more price reporting periods will be an accurate predictor of the expected clearing price in a future price reporting period. Accordingly, if at method operation 66, the ad market server determines that the ad request is needed by one of the external markets to fulfil the price optimization testing requirements, the ad request will be directed to an external market for testing purposes. Accordingly, at method operation 68, the ad request will be redirected to a selected external market to fulfil testing requirements for the particular ad space at a particular external market. The selected external market will process the ad request to determine the ad to be served. If no advertisers participating in the external market are willing to meet or exceed the publisher-established reserve price associated with the ad request, the default or fallback ad is served.

If the ad market server, at method operation 66, determines that the testing requirements for the ad space associated with the ad request are satisfied, then at method operation 70 the ad market server sets the reserve price for the ad space associated with the ad request to a market reserve price that is based on an analysis of the results of the price optimization process for one or more prior price reporting periods. For example, if the actual average clearing price at one or more external markets in one or more prior price reporting periods exceeds the publisher-established reserve price, the reserve price for the ad space associated with the ad request may be increased to a market reserve price to reflect the willingness of advertisers in the external markets to pay more than the publisher-established reserve price. In some embodiments, the analysis is performed over a rolling number of price reporting periods. Alternatively, in some embodiments, the actual average clearing price for an external market may be based on information obtained from the most recent prior price reporting period. When more than one external market has an actual average clearing price that exceeds the publisher-established reserve price, the market reserve price for the ad request may be based on the highest actual average clearing price, or in some embodiments, an average. For instance, if three of five external markets have actual average clearing prices for the ad space that exceed the publisher-established reserve price, the actual average clearing prices for those three external markets may be averaged to derive the market reserve price for the ad space. Alternatively, in some embodiments, the lowest of the actual average clearing prices may be selected as the market reserve price for the ad space.

In some embodiments, the actual average clearing price for an ad space in an external market over one or more prior price reporting periods is used as the expected clearing price for an ad space in a current price reporting period. Accordingly, at method operation 72, one external market is selected from all of the external markets that have an expected clearing price for the ad space that exceeds the publisher-established reserve price. The selection may be based on a weighted round robin algorithm such that the external market with the highest expected clearing price, based on the actual average clearing price for the ad space in one or more prior price reporting periods, will be selected more frequently than those external markets with lower expected clearing prices that still exceed the publisher-established reserve price.

Finally, at method operation 74, a winning bidder is selected by determining whether the expected clearing price for the ad request at the external market (selected at method operation 72) exceeds the highest active bid from a bidder in the real-time bidding market, whose bid exceeds the market reserve price. If the expected clearing price for the selected external market is higher than the highest active bid, the ad request is directed to the external market for processing (e.g., at method operation 68.) If the highest active bid in the real-time bidding market exceeds the expected clearing price at the selected external market, then a display ad of the highest bidder is served at method operation 64.

If a particular external market receives a sufficient number of ad requests for a particular ad space as a result of consistently having a higher expected clearing price than the highest bid in the real-time bidding market, then the external market should meet the minimum volume of traffic to accurately predict the expected clearing price, without needing to redirect test traffic to the external market. However, for those external markets that do not receive a sufficient number of ad requests as a result of their expected clearing price not exceeding the highest active bid in the real-time bidding market, additional test traffic will be required to meet the minimum traffic requirements needed to accurately predict the expected clearing price, based on actual clearing prices.

Figure 5:
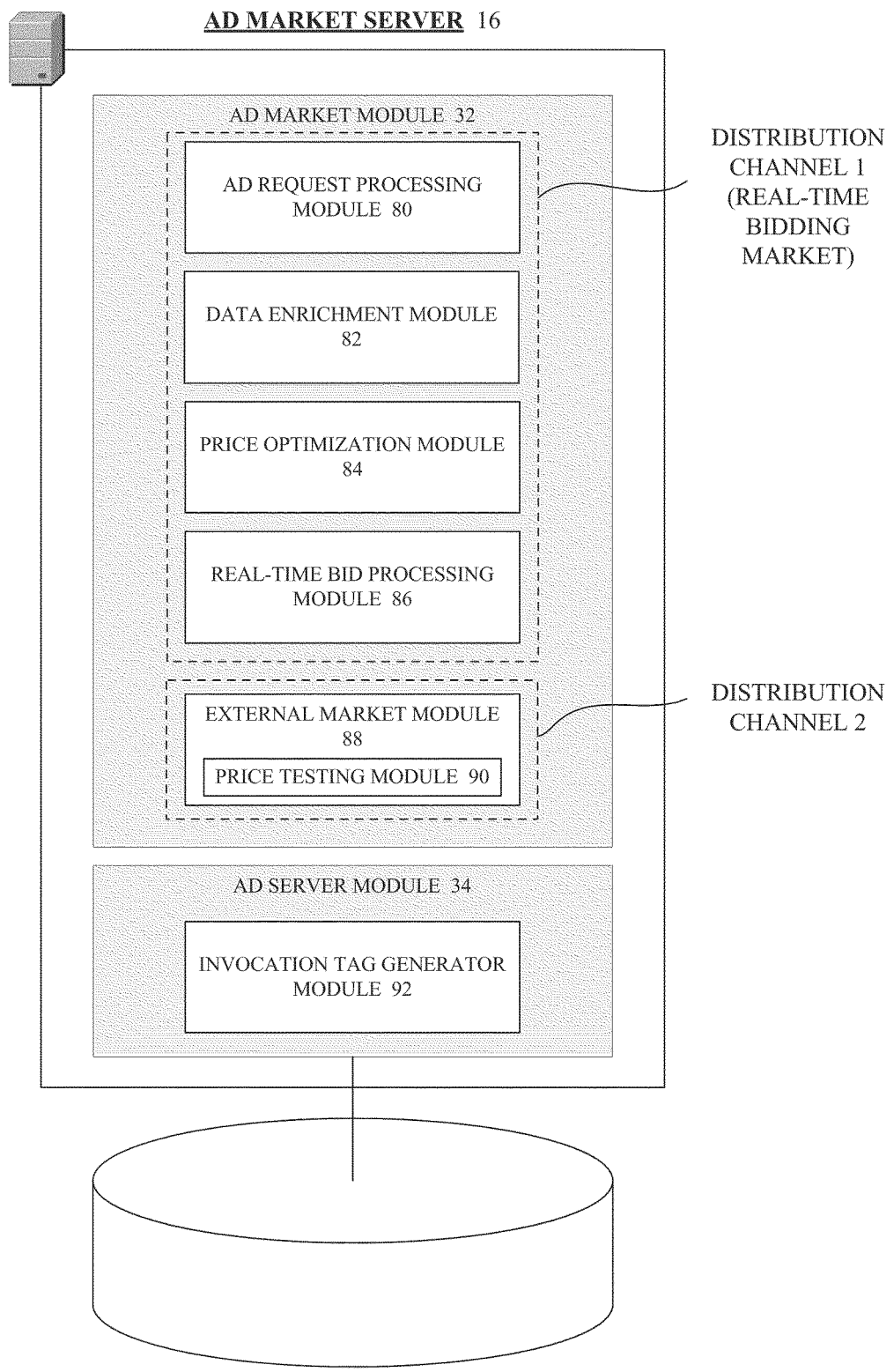
FIG. 5 illustrates an example of the functional modules that comprise an ad market server 16, according to an embodiment of the invention.

FIG. 5 illustrates an example of the functional modules that comprise an ad market server 16, according to an embodiment of the invention. In FIG. 5, the ad market server 16 is shown to include an ad market module 32 and an ad server module 34. In some embodiments, the ad server module 34 will reside and execute on a separate and distinct server, as described above in connection with the description of FIG. 1.

The ad market module 32 is shown to include an ad request processing module 80, a data enrichment module 82, a price optimization module 84, a real-time bid processing module 86 and an external market module 88. Skilled artisans will readily recognize that one or more modules may be excluded in certain embodiments, without departing from the spirit and scope of the invention. Similarly, in some embodiments, the functions described herein as being attributable to one module, may be combined with, or attributable to, other modules.

In some embodiments, the ad request processing module 80 receives and processes ad requests. For example, when an invocation tag is processed at a browser application, an ad request is generated and directed to the ad market server 16. The ad request processing module 80 receives the ad request, identifies an ad space associated with the ad request, and then determines if the ad request (and corresponding ad space) has previously been determined to be eligible for the market maker process. Depending upon the market maker process eligibility determination, the ad request processing module 80 may forward or "hand-off" the ad request to one or more other modules for further processing. For example, the ad request processing module 80 may forward the ad request to the external market module 88 to determine whether the external market testing requirements (described in connection with method operation 66 of FIG. 4) for the ad request (and corresponding ad space) has been satisfied.

The data enrichment module 82 enables advertiser's to link third-party provided data with the publisher-provided information describing a particular ad space being offered via the real-time bidding market. For instance, the data enrichment module 82 may facilitate the acquisition and display of third-party data that provides an advertiser with additional information about particular content, and the likely viewers of the particular content, in which an ad space is being offered. This allows an advertiser to make a more informed decision about the value of the particular ad space being offered.

The price optimization module 84 operates in conjunction with the external market module 88 to establish a market reserve price for ad spaces that are being offered in the real-time bidding market, and to establish the expected clearing price for each ad space that has been submitted to one of various external markets. In some embodiments, the price optimization module 84 analyzes data received from one or more external markets to derive an expected clearing price for each ad space at each external market. In particular, the data received from the external markets indicates the actual clearing prices for ad requests processed at the external markets in a prior price reporting period. This information is then used to derive an expected clearing price for ad spaces at the external markets. In some embodiments, the expected clearing price for an ad space at a particular external market is based on the average actual clearing price over a rolling number of price reporting periods. If the expected clearing price for a particular ad space for at least one external market is determined to be greater than the publisher-established reserve price, then the publisher-established reserve price is increased to a market reserve price. When there are several external markets that have expected clearing prices for a particular ad request that exceed the publisher-established reserve price for the ad request, the market reserve price for the ad request may be set to the highest actual average clearing price of the external markets that have average actual clearing prices that exceed the publisher-established reserve price. Alternatively, the market reserve price may be derived as an average of the average actual clearing prices for the external markets with average actual clearing prices that exceed the publisher-established reserve price. In some embodiments, when determining whether a particular external market's average actual clearing price for a particular ad space exceeds the publisher-established reserve price for the ad space, a fee charged by the operator of the real-time bidding market for brokering the transaction is taken into consideration. Accordingly, the publisher-established reserve price may only be increased if an external market reports an average actual clearing price for an ad space that exceeds the publisher-established reserve price by an amount greater than the fee charged by the operator of the real-time bidding market.

The real-time bid processing module 86 determines the winning bidder when an ad request is being processed. If the particular ad request is not participating in the market maker process, the bid processing module 86 selects the winning bidder among the participating advertisers in the real-time bidding market. Accordingly, the winning bidder is the bidder that has the highest active bid that exceeds the publisher-established reserve price for the ad space. If no such bidder exists, the default ad specified by the content publisher is served. However, if the particular ad request is associated with an ad space that is eligible for participation in the market maker process, the bid processing module determines the winning bidder between the participating advertisers in the real-time market and one external market selected based on a determination that the selected external market has an expected clearing price for the ad space associated with the ad request that exceeds the publisher-established reserve price. If the expected clearing price for the ad space for the selected external market exceeds the highest active bid from the advertisers participating in the real-time bidding market, the ad request is re-directed to the external market. If the highest bidder in the real-time bidding market has a bid that exceeds the expected clearing price for the ad space for the selected external market, then the participating advertiser with the highest bid is determined to be the winner, and an ad specified by the highest bidding advertiser is served in response to the ad request.

The external market module 88 facilitates the redirection and forwarding of ad requests to one or more external markets, as well as the external market testing requirements. In some embodiments, an ad request received at the ad market server may be redirected to an external market to be fulfilled. This occurs when the expected clearing price for the ad space associated with the ad request exceeds the highest bid from the participating advertisers in the real-time bidding market and the market reserve price for the ad request. An ad request may also be forwarded to an external market to satisfy external market testing requirements. Specifically, when a particular ad space is configured to use the market maker process, each external market to which the ad space has been submitted is required to receive a certain number of ad requests during each price reporting period in order to accurately predict an expected clearing price for the ad request in a subsequent price reporting period. Accordingly, the external market module 88 includes a price testing module 90 that keeps track of the ad request count for each ad space during a price reporting period. Additionally, the price testing module 90 may implement an algorithm for determining how external markets are selected and ad requests are redirected for testing purposes. In some embodiments, each external market is to receive a predetermined percentage of the estimated traffic for a particular ad campaign, which is evenly divided among the external markets to which the particular ad space has been submitted for purposes of the market maker process.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a service, such as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 6:
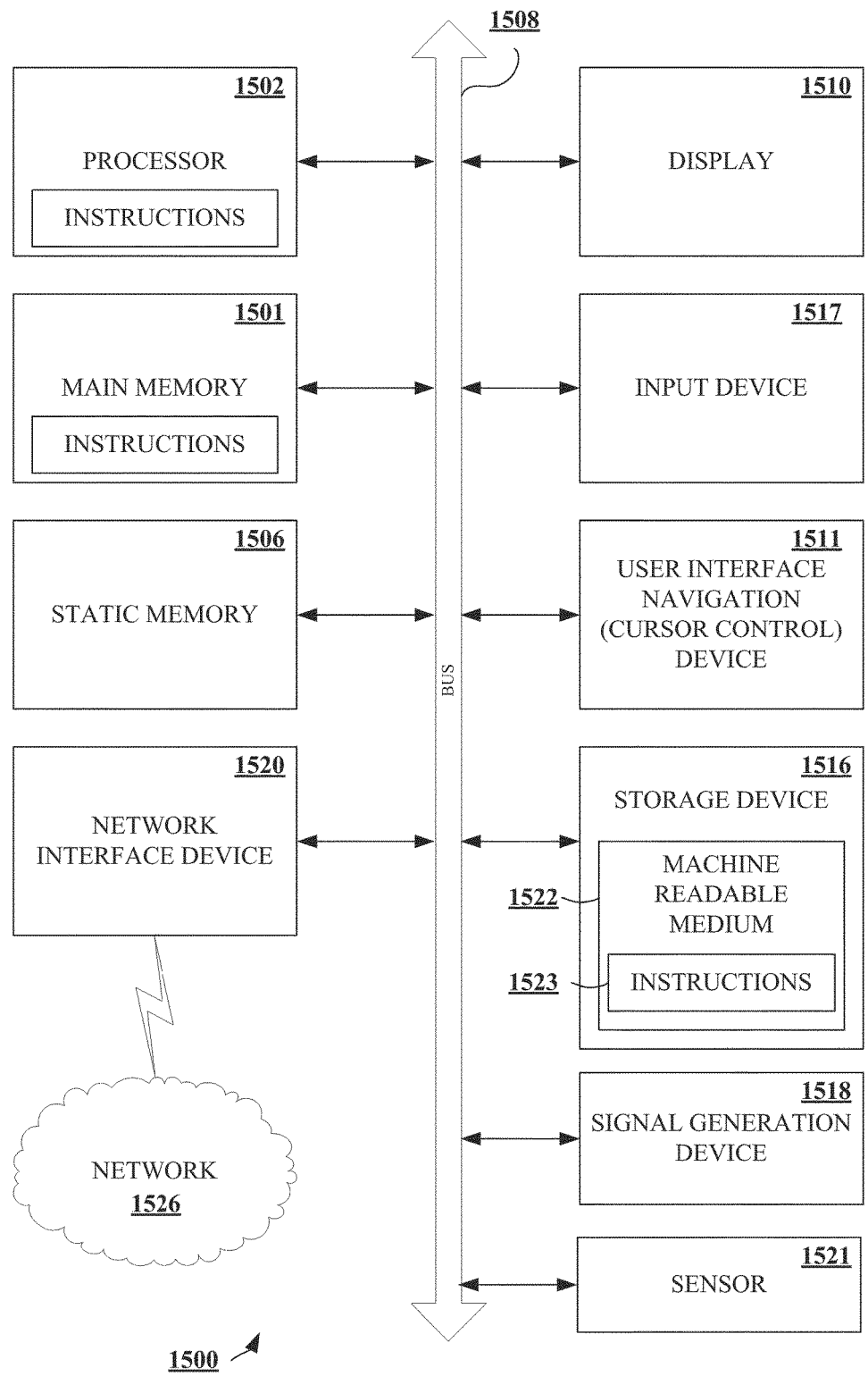
FIG. 6 is a block diagram of a machine in the form of a computing device within which a set of instructions, for causing the machine to perform any one or more of the methodologies discussed herein, may be executed.

FIG. 6 is a block diagram of a machine in the form of a mobile device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method for delivering display advertising and embedding the display advertising in real-time into a webpage that is rendered for display online to client computers, comprising:

providing a web-based interface by the ad server, accessible by the internet, for communication with a plurality of content servers;

receiving, by the internet, an ad request for display advertising, from one or more processors associated with the ad server, the ad request for a particular space on the web page, the ad request for display advertising having an ad request identifier indicative of the space in the webpage encoded in HTML provided by the content server configured to serve the webpage to a browser interface within the client computers and associated with a particular ad campaign and the ad server using the ad identifier to perform a look-up operation to determine additional information about the ad space associated with the ad request, where an ad is to be placed on the webpage and receiving, by the internet a publisher-established threshold provided by the content server offering an ad space for the display advertising, the one or more processors inserting an invocation tag associated with the ad space in the webpage, the invocation upon processing by the client computer received by the one or more processors;

determining, by the one or more processors, whether the ad request qualifies for processing by the ad server, based on requirements specified by the ad server, wherein the ad that is embedded within the web page is inserted by real-time bidding operation that is facilitated by the ad server;

assigning the ad request a threshold value that is determined based on an analysis by the one or more processors of ad server, of actual clearing data for previously processed ad requests with the same ad request identifier, the previously processed ad requests previously directed to and processed at an external interface including at least one of an ad network and an ad exchange in one or more prior reporting periods over which an ad space is made available to the ad network and the ad exchange;

processing the ad request with the threshold by the one or more processors at the ad market server to determine a winning ad server for the ad request upon a determination that the ad request qualifies for processing based on the requirements of the ad server;

prior to processing the ad request with the threshold to determine a winning ad server for the ad request, determining by the one or more processors that the ad request is not needed to fulfill a minimum volume requirement for an external market of a plurality of external markets configured to receive ad requests having the same ad request identifier and prior to assigning the ad request, considering the threshold that is determined based on an analysis of actual clearing thresholds of previously processed ad requests with the same ad request identifier, and determining that the ad request is eligible for having its publisher-established reserve threshold increased based on the analysis;

identifying a geographical location of a content consumer viewing the webpage to determine whether the content consumer resides in a geographical location that is of interest to a particular advertiser offering an ad for placement on the webpage; and serving an ad of the winning ad server by the one or more processors into the space on the webpage.

2. The computer-implemented method for delivering display advertising of claim 1, further comprising:

prior to assigning the ad request a threshold value, deriving an expected clearing value for the ad request with optimization procedure, the expected clearing value derived from previously processed ad requests processed at the external interface over a predetermined rolling number of prior reporting periods.

3. The computer-implemented method for delivering display advertising of claim 2, further comprising:
presenting a listing for the ad space with the threshold value wherein the ad space includes an area for an image-based ad.

4. The computer-implemented method for delivering display advertising of claim 2, wherein assigning the ad request a threshold value that is determined based on an analysis of actual clearing values for ad requests with the same ad request identifier that were directed to and processed at the external market in one or more prior reporting periods includes assigning the ad request a threshold value equal to the expected clearing value for the ad request when the expected clearing value for the ad request exceeds the publisher-established reserve value.

5. The computer-implemented method for delivering display advertising of claim 2, wherein assigning the ad request a threshold value that is determined based on an analysis of actual clearing values for ad requests with the same ad request identifier that were directed to and processed at the external market interface in one or more prior reporting periods includes assigning the ad request a threshold value equal to the publisher-established threshold value when the expected clearing value for the ad request is equal to or less than the publisher-established threshold value.

6. The computer-implemented method for delivering display advertising of claim 1, wherein processing the ad request with the threshold value to determine a winning ad server for the ad request includes utilizing a real-time bid processing operation to analyze active bids for the ad request from participants in a real-time bidding interface and to identify the winning ad server as the participant having the highest active bid for the ad request exceeding the threshold.

7. The computer-implemented method for delivering display advertising of claim 1, further comprising:
prior to receiving the ad request, deriving, by an optimization operation, an expected clearing threshold for the ad request for each external interface of a plurality of external markets, the expected clearing value for each external interface in the plurality of external markets derived as the revenue per ad request for all ad requests with the same identifier processed at a respective external interface over a predetermined rolling number of prior value reporting periods; and
assigning to each external market interface a respective expected clearing threshold for the ad request.

8. The computer-implemented method for delivering display advertising of claim 6, wherein processing the ad request with the threshold to determine a winning ad server for the ad request includes utilizing a real-time bid processing operation to i) analyze active bids for the ad request from participants in a real-time bidding and an expected clearing value for the ad request assigned to a particular external market, and ii) forward the ad request to the particular external market to be processed at the particular external market when the respective expected clearing value for the ad request assigned to the particular external market exceeds the market reserve price assigned to the ad request and the highest active bid from the participants in the real-time bidding market.

9. The computer-implemented method for delivering display advertising of claim 7, further comprising:

utilizing an external market selection algorithm to select the particular market from the plurality of external markets.

10. The computer-implemented method for delivering display advertising of claim 1, further comprising:
prior to assigning the ad request a threshold value that is determined based on an analysis of actual clearing values for previously processed ad requests with the same ad request identifier, determining that the ad request is eligible for having its publisher-established threshold value increased based on the analysis.

11. A web-based interface system for delivering display advertising and embedding the display advertising on a webpage online to client computers by the internet, comprising:
a processor, and;
a memory storing instructions that, when executed, cause the system to:
provide a web-based interface by the ad server, accessible by the internet, for communication with a plurality of content servers;
receive, an ad request for the ad server, by the internet, an ad request for display advertising, the ad request having an ad request identifier indicative of a space in a webpage encoded in HTML provided by a content server module configured to serve web pages to a browser interface within the client computers, where an ad is to be placed on the webpage and associated with a particular ad campaign and the ad server using the ad identifier to perform a look-up operation to determine additional information about the ad space associated with the ad request and receiving, by the internet a publisher-established threshold value provided by the content server offering an ad space for the display advertising, the ad request processing module inserting an invocation tag associated with the ad space in the webpage, the invocation upon processing by the client computer received by the ad request processing module;
determine whether the ad request qualifies for processing by the ad market server, based on requirements specified by the ad market server, wherein the ad that is embedded within the web page is determined by the real-time bidding that is facilitated by the ad market server;
assign the ad request a threshold value that is determined based on an analysis by the ad market server, of actual clearing values for previously processed ad requests with the same ad request identifier, the previously processed ad requests previously directed to and processed at an external market interface including at least one of an ad network and an ad exchange in one or more prior price reporting periods over which an ad space is made available to the ad network and the ad exchange;
process the ad request with the threshold value to determine a winning ad server for the ad request upon a determination that the ad request qualifies for processing based on the requirements of the ad server;
prior to processing the ad request with the threshold value to determine a winning ad server for the ad request, determine that the ad request is not needed to fulfill a minimum volume requirement for an external market interface of a plurality of external markets configured to receive ad requests having the same ad request identifier;

identifying a geographical location of a content consumer viewing the webpage to determine whether the content consumer resides in a geographical location that is of interest to a particular advertiser offering an ad for placement on the webpage; and serve an ad of the winning bidder into the space in the webpage.

12. The system for delivering display advertising online of claim 11, further comprising:

the memory storing instructions that, when executed, cause the system to:

prior to assigning the ad request a threshold value, derive an expected clearing value for the ad request with an optimization operation, the expected clearing value derived as revenue per previously processed ad request for ad requests processed at the external market over a predetermined rolling number of prior value reporting periods.

13. The system for delivering display advertising online of claim 12, further comprising:

the memory storing instructions that, when executed, cause the system to:

present an auction listing for ad space with the market reserve price wherein the ad space includes an area for an image-based ad.

14. The system for delivering display advertising online of claim 12, wherein assigning the ad request a threshold value that is determined based on an analysis of actual clearing prices for ad requests with the same ad request identifier that were directed to and processed at an external market in one or more prior reporting periods includes assigning the ad request a threshold value equal to the expected clearing for the ad request when the expected clearing for the ad request exceeds the publisher-established reserve.

15. The system for delivering display advertising of claim 12, wherein assigning the ad request a threshold value that is determined based on an analysis of actual clearing values for ad requests with the same ad request identifier that were directed to and processed at an external market in one or more prior reporting periods includes assigning the ad request a threshold value equal to the publisher-established threshold value when the expected clearing value for the ad request is equal to or less than the publisher-established reserve value.

16. The system for delivering display advertising of claim 11, wherein processing the ad request with the threshold value to determine a winning ad server for the ad request includes utilizing a real-time bid operation to analyze active bids for the ad request from participants in a real-time bidding and to identify the winning ad server as the participant having the highest active bid for the ad request exceeding the threshold.

17. The system for delivering display advertising of claim 11, further comprising:

the memory storing instructions that, when executed, cause the system to:

prior to receiving the ad request, derive, with an optimization operation, an expected clearing value for the ad request for each external market of a plurality of external markets, the expected clearing value for each external market in the plurality of external markets derived as the revenue per ad request for all ad requests with the same identifier processed at a respective external market over a predetermined rolling number of prior reporting periods; and assign to each external market a respective expected clearing value for the ad request.

18. The system for delivering display advertising of claim 16, wherein processing the ad request with the market reserve value to determine a winning ad server for the ad request includes utilizing a real-time bid processing operation to i) analyze active bids for the ad request from participants in a real-time bidding market and an expected clearing value for the ad request assigned to a particular external market, and ii) forward the ad request to the particular external market to be processed at the particular external market when the respective expected clearing value for the ad request assigned to the particular external market exceeds the market reserve value assigned to the ad request and the highest active bid from the participants in the real-time bidding.

19. The system for delivering display advertising of claim 17, further comprising:

the memory storing instructions that, when executed, cause the system to:

utilize an external market selection algorithm to select the particular market from the plurality of external markets.

20. The system for delivering display advertising of claim 11, further comprising:

the memory storing instructions that, when executed, cause the system to:

prior to assigning the ad request a reserve threshold that is determined based on an analysis of actual clearing values for previously processed ad requests with the same ad request identifier, determine that the ad request is eligible for having its publisher-established threshold value increased based on the analysis.

* * * * *